United States Patent Office 3,455,885
Patented July 15, 1969

3,455,885
ANIONIC POLYMERIZATION OF LACTAMS WITH N-CHLOROCARBONYL - 2 - CHLORO-2,3-DEHYDROPOLYMETHYLENEIMINE AS COCATALYST
Katsuaki Oka, Neyagawa-shi, Shohei Tokiura, Hirakata-shi, Tatsuo Yamamoto, Ukyo-ku, and Yoshikazu Sasaki and Hideo Ishida, Hirakata-shi, Japan, assignors to Ube Industries Ltd., Nishihon-machi, Ube-shi, Yamaguchi, Japan
No Drawing. Filed Aug. 17, 1966, Ser. No. 572,924
Claims priority, application Japan, Oct. 20, 1965, 40/63,933
Int. Cl. C08g *20/10, 20/18*
U.S. Cl. 260—78                        12 Claims

ABSTRACT OF THE DISCLOSURE

A process for polymerizing lactams to polyamides using a lactam-base salt and a co-catalyst which is N-chlorocarbonyl-2-chloro-2,3-dehydropolymethyleneimine having the formula:

$$\begin{array}{c} CH=C-Cl \\ | \quad\quad | \\ (CH_2)_n-N-COCl \end{array}$$

where $n$ is an integer from 2 to 10.

---

This invention relates to a process, and more particularly to an improved process for the polymerization of lactams to polyamides.

The polymerization of caprolactam to give 6-nylon, a polyamide, has been known for many years. The earliest processes for this polymerization involved the use of water or acidic reagents as polymerization catalysts and were slow. Subsequent work showed that anhydrous caprolactam could be polymerized above 200° C. in the presence of strongly basic materials, particularly the alkali and alkaline earth metals, their hydrides, hydroxides, alkoxides, oxides, and amides. More recently, it has been disclosed that the anionic polymerization of caprolactam and other lactams can be made especially fast by the addition of certain compounds which function as co-catalysts. Particularly effective co-catalysts which have been disclosed include acyl halides, anhydrides, and the like, isocyanates, triazine derivatives and compounds containing tertiary nitrogen having at least two of the three substituents on the nitrogen atom consisting of carbonyl, thiocarbonyl, sulfonyl, phosphinyl, thiophosphinyl and nitroso radicals.

The present invention provides an improved process for rapidly polymerizing lactams. More particularly, the process of this invention provides an improvement in the process for polymerizing lactams in the presence of well-known iminium salts. This improvement comprises carrying out said polymerization in the presence of a co-catalyst, N - chlorocarbonyl-2-chloro-2,3-dehydropolymethyleneimine having the following formula:

$$\begin{array}{c} CH=C-Cl \\ | \quad\quad | \\ (CH_2)_n-N-COCl \end{array}$$

where $n$ is an integer from 2 to 10.

Among the co-catalysts of the present invention which proved to be effective, the following compounds are included.

N-chlorocarbonyl-2-chloro-2,3-dehydrotetramethyleneimine
N-chlorocarbonyl-2-chloro-2,3-dehydropentamethyleneimine
N-chlorocarbonyl-2-chloro-2,3-dehydrohexamethyleneimine
N-chlorocarbonyl-2-chloro-2,3-dehydroheptamethyleneimine
N-chlorocarbonyl-2-chloro-2,3-dehydrododecamethyleneimine These compounds are prepared by the methods described in "Journal of the Chemical Society of Japan, vol. 84, No. 9, 736–740 (1963)," [Fukumoto Tsugio, Murakami Masuo; Studies on synthesis of DL-lysine. (1) Synthesis of DL-lysine from ε-caprolactam by using phosgene] namely, by reacting phosgene with lactam.

The polymerization process of this invention is particularly effective in rapidly producing high molecular weight polyamides from lactams containing from 3 to 12 or more carbon atoms in the lactam ring. Such lactams include pyrrolidone, piperidone, caprolactam, enantholactam, caprylolactam, and laurolactam. Generally in the presence of co-catalysts, the anionic polymerization process of lactam can be carried out at temperatures above the melting point of the lactam monomer, but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 190° C. Caprolactam is readily polymerized by the process of this invention at temperatures between 100° C. and 200° C., with 160° C. being a convenient operating temperature. The well-known iminium salts used in the process of this invention are prepared by the reaction of bases with a lactam. Generally, the lactam to be polymerized is used for the preparation of the anionic catalyst; but if desired, the anionic catalyst can be prepared from another lactam.

The substances employed to form the anionic catalyst can be an alkali metal, an alkaline earth metal, aluminium, or a basic derivative of one of these metals such as hydroxide, alkoxide, hydride, aryl, amide, or organic acid salt. All of these substances are such as are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methylate, sodium ethylate, sodium phenolate, sodium α- or β-naphtholate, sodamide, sodium stearate, lithium aluminium hydride, aluminium propylate, and the like, are suitable substances for the preparation of the anionic catalyst. This anionic catalyst, that is, lactam-base salt, is prepared by heating the lactam with aforesaid substances at a temperature between about 25° C. and about 200° C. The said substances can be added to the total lactam which is to be polymerized or to a portion of it in order to prepare the anionic catalyst. The latter can be added to the remainder of the lactam later. Little or no polymerization occurs during the preparation of the anionic catalyst. The time required for the preparation of the anionic catalyst depends upon the properties of the said substances employed, the quantity added, and the temperature chosen and generally can be from a few seconds to several hours. Preferably, the lactam should be essentially as anhydrous as the added substance should be. The ratio of the said substance to be added usually is in the range between about 0.1 and 10 mole percent based on the lactam, which is necessary to conduct the polymerization. The higher the ratio of the anionic catalyst to lactam, the lower is the molecular weight of the polyamides which can be obtained. Consequently, the optimum proportions for most purposes are from about 0.1 to about 5 mole percent.

The co-catalyst, N-chlorocarbonyl-2-chloro-2,3-dehydropolymethyleneimine, can be employed in proportions varying from about 0.1 to about 5 mole percent based on the lactam. At any time when the polymerization is desired, the co-catalyst can be added to the lactam containing the anionic catalyst. Otherwise, this can be done as well, when the anionic catalyst and co-catalyst are dissolved in two portions of the total lactam separately and are subsequently mixed together. For optimum operation of the process of this invention, an inert gas such as nitrogen is introduced onto the surface of the molten lactam during the reaction to prevent oxidation.

The process of this invention is useful in rapidly preparing cast articles of any size and shape directly from lactams. The process can be employed to obtain unusual shapes which would be difficult, if not impossible, to obtain by the conventional molding method of polyamides. The process has advantage when used in the manufacture of large molded articles, because injection molding or similar processes require high temperatures and high pressures for their operations. Therefore, simpler and lighter weight molds can be employed and faster cycles can often be obtained in the manufacture of large, shaped articles. The entire process can be carried out in the mold or, if desired, the lactam solution containing the anionic catalyst and a second portion of the lactam solution containing the co-catalyst can be mixed and then immediately cast into the mold by procedures similar to those of transfer molding so as to obtain the desired shaped article in any size at a very high rate. Similarly, it is possible to employ the process of this invention in many extrusion-type operations, in which the lactam containing the anionic catalyst and another portion of the lactam containing the co-catalyst are intimately mixed and then extruded under conditions which provide for obtaining an extrudate which is formed immediately following the polymerization process.

The process of this invention is operable in the presence of various fillers and reinforcing agents. Thus, if desired, glass mats or mats of synthetic fibers can be impregnated and then polymerized. Similarly, finely-divided fillers can be suspended in the polymerizing mixture to obtain filled polyamides. Antioxidants, blowing agents, plasticizers, other resins (e.g., polystyrene, polyvinyl chloride, polyacetal, polyester), colorants, and the like can also be employed. The process of this invention contemplates the use of the process under all of the above conditions.

The invention is more thoroughly illustrated with the aid of the following examples.

Relative viscosity described in the following examples was determined with Ostwald's viscosimeter with a solution of 1% of the polymer in 98% sulfuric acid and at 25° C.

Example 1

A mixture of 22.6 g. of dry caprolactam, and 1.08 g. of sodium salt of caprolactam was placed in a reaction vessel which was immersed in a silicone oil bath at 160° C. and nitrogen was introduced onto the molten caprolactam at the rate of 300–400 cc./minute. Then, 0.39 g. of N-chlorocarbonyl-2-chloro-2,3-dehydrohexamethyleneimine as co-catalyst was added to the molten caprolactam.

A very viscous state was observed two minutes after the addition of the co-catalyst. A white cloudy substance, indicating crystallization, was produced in five minutes, and the shrinking of the polymer from the walls of the reaction vessel was observed in about ten minutes. At that time, the produced polycaprolactam was cooled to the room temperature.

The conversion to polycaprolactam was found to be 93.9 percent by weight, and the relative viscosity of the polycaprolactam was 3.23.

N-chlorocarbonyl-2-chloro-2,3 - dehydrohexemethyleneimine as co-catalyst was prepared by the reaction of caprolactam with phosgene, and it was an oily viscous liquid having a boiling point of 110–111° C. (10 mm. Hg), and a refractive index $n_D^{20}$ of 1.5222.

Example 2

The procedure of Example 1 was repeated, but the polymerization temperature was held at 120° C. and 0.184 g. of sodium metal was added instead of the sodium salt of caprolactam.

The produced white polycaprolactam was cooled in thirty minutes after the addition of the co-catalyst at the room temperature.

The conversion to polycaprolactam was found to be 83.8 percent by weight, and the relative viscosity of the polycaprolactam was 2.57.

Example 3

A mixture of 22.6 g. of the molten caprolactam, 0.046 g. of sodium metal, and 1.10 g. of N-chlorocarbonyl-2-chloro-2,3-dehydrotetramethyleneimine was placed in a reaction vessel which was immersed in a silicone oil bath at 160° C. Nitrogen was introduced onto the surface of the material in the vessel.

After the addition of the co-catalyst, a very viscous state was observed in about three minutes, and the shrinking of the polymer from the walls of the reaction vessel was observed in fifteen minutes.

The conversion to polycaprolactam was found to be 91.3 percent by weight, and the relative viscosity of the polycaprolactam was 6.43.

N-chlorocarbonyl - 2-chloro-2,3 - dehydrotetramethyleneimine as co-catalyst was prepared by the reaction of pyrrolidone with phosgene, and it was an oily viscous liquid having a boiling point of 102–103° C. (5 mm. Hg), and a refractive index $n_D^{22}$ of 1.5463.

Example 4

The procedure of Example 1 was repeated but 0.39 g. of N-chlorocarbonyl-2-chloro - 2,3-dehydrotetramethyleneimine was added instead of N-chlorocarbonyl-2-chloro-2,3-dehydrohexamethyleneimine.

In fifteen minutes after the addition of the co-catalyst, a solid polycaprolactam was obtained.

The conversion to polycaprolactam was found to be 91.0 percent by weight, and the relative viscosity of the polycaprolactam was 5.23.

Example 5

The procedure of Example 1 was repeated but 0.92 g. of sodium metal instead of sodium salt of caprolactam, and 0.556 g. of N-chlorocarbonyl-2-chloro-2,3-dehydrodecamethyleneimine instead of N-chlorocarbonyl-2-chloro-2,3-dehydrohexamethyleneimine as co-catalyst was added.

In forty minutes after the addition of the co-catalyst, the conversion to polycaprolactam was found to be 86.4 percent by weight, and the relative viscosity of the polycaprolactam was 3.23.

N-chlorocarbonyl-2-chloro - 2,3-dehydrododecamethyleneimine as co-catalyst was prepared by the reaction of laurolactam with phosgene, and it was an oily viscous liquid having a boiling point of 160° C. (6 mm. Hg), and a refractive index $n_D^{20}$ of 1.4913.

We claim:

1. In a process for the polymerization of substantially anhydrous lactams having from 3 to 12 carbon atoms in the ring which comprises heating said lactam to a temperature below the melting point of the resulting polyamide in the presence of from about 0.1 to about 10 mole percent, based on lactam, of a lactam-base salt and a co-catalyst, the improvement which comprises using as the co-catalyst from about 0.1 to about 5 mole percent, based on lactam, of N-chlorocarbonyl -2-chloro-,3-dehydropolymethyleneimine having the formula:

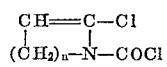

where $n$ is an integer from 2 to 10.

2. The process of claim 1 wherein said co-catalyst is N - chlorocarbonyl - 2 - chloro - 2,3 - dehydrotetramethyleneimine.

3. The process of claim 1 wherein said co-catalyst is N - chlorocarbonyl - 2 - chloro-2,3-dehydropentamethyleneimine.

4. The process of claim 1 wherein said co-catalyst is N - chlorocarbonyl - 2 - chloro - 2,3 - dehydrohexamethyleneimine.

5. The process of claim 1 wherein said co-catalyst is N - chlorocarbonyl-2-chloro-2,3-dehydroheptamethyleneimine.

6. The process of claim 1 wherein said co-catalyst is N - chlorocarbonyl - 2 - chloro-2,3-dehydrododecamethyleneimine.

7. In a process for the polymerization of substantially anhydrous caprolactam which comprises heating said lactam to a temperature below the melting point of the resulting polyamide in the presence of from about 0.1 to about 10 mole percent, based on lactam, a lactam-base salt and a co-catalyst, the improvement which comprises using as the co-catalyst from about 0.1 to about 5 mole percent, based on lactam, of N-chlorocarbonyl-2-chloro-2,3-dehydropolymethyleneimine having the formula

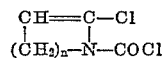

where $n$ is an integer from 2 to 10.

8. The process of claim 7 wherein said co-catalyst is N - chlorocarbonyl - 2 - chloro - 2,3 - dehydrotetramethyleneimine.

9. The process of claim 7 wherein said co-catalyst is N - chlorocarbonyl - 2 - chloro-2,3-dehydropentamethyleneimine.

10. The process of claim 7 wherein said co-catalyst is N - chlorocarbonyl - 2 - chloro - 2,3 - dehydrohexamethyleneimine.

11. The proces of claim 7 wherein said co-catalyst is N - chlorocarbonyl - 2 - chloro-2,3-dehydroheptamethyleneimine.

12. The process of claim 7 wherein said co-catalyst is N - chlorocarbonyl - 2 - chloro-2,3-dehydrododecamethyleneimine.

References Cited

UNITED STATES PATENTS 3,017,391  1/1962  Mottus et al. _____ 260—78
3,138,576  6/1964  Anderson et al. _____ 260—78

HAROLD D. ANDERSON, Primary Examiner

U.S. Cl X.R.

260—2.5, 37, 239, 857